United States Patent Office 3,662,032
Patented May 9, 1972

3,662,032
HYDROXY CONTAINING AROMATIC
PHOSPHITES
Otto S. Kauder, Jamaica, and William E. Leistner, Brooklyn, N.Y., assignors to Argus Chemical Corporation, Brooklyn, N.Y.
No Drawing. Continuation-in-part of application Ser. No. 160,237, Dec. 18, 1961. This application Feb. 25, 1966, Ser. No. 529,918
Int. Cl. C07f 9/12; C08f 45/58
U.S. Cl. 260—930                                  6 Claims

ABSTRACT OF THE DISCLOSURE

Organic phosphites are provided having in the molecule at least one polycarbocyclic phenolic group for each phosphite group, such polycarbocyclic phenolic group having from one to about thirty carbon atoms per phenolic group, and having the formula

and the phosphite having the formula

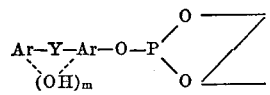

wherein Ar is a carbocyclic nucleus and at least one Ar nucleus has a phenolic hydroxyl group, m has a value from one to about five; and Z is taken in sufficient number to satisfy the valences of the two phosphite oxygen atoms and is selected from the group consisting of hydrogen, monovalent and bivalent organic hydrocarbon radicals having from about one to about twenty-four carbon atoms, and monovalent and bivalent phenolic groups having from one to about thirty carbon atoms per phenolic hydroxyl group, and selected from the group consisting of $(HO)_m$—AR and

which in polymeric phosphites are linked to additional phosphite groups, such polymeric phosphites containing at least one alkyl group per phosphite group, and Y is a linking nucleus selected from the group consisting of oxygen, alkylene, oxyalkylene, sulfoalkylene and cyclohexylene, the alkylene having from one to five carbon atoms.

This application is a continuation-in-part of Ser. No. 160,237, filed Dec. 18, 1961.

This invention relates to new organic phosphites and to synthetic resin and particularly olefin polymer and polyvinyl chloride resin compositions containing the same, and having, as a result, an improved resistance to deterioration, evidenced particularly by improved long term stability, when heated at elevated temperatures.

Many organic phosphites have been proposed as stabilizers for polyvinyl chloride resins, and are employed either alone or in conjunction with other stabilizing compounds, such as polvalent metal salts of fatty acids and alkyl phenols. Such phosphite stabilizers normally contain an alkyl or aryl radical in sufficient number to satisfy the three valences of the phosphite, and typical phosphites are described in the patent literature, for example, U.S. Pats. Nos. 2,564,646, 2,716,092, and 2,997,454.

Phosphites are also employed in conjunction with other stabilizers such as a polyhydric phenol in the stabilization of polypropylene and other polyolefins against degradation upon heating or ageing under atmospheric conditions. The polyhydric phenol is thought to function as an antioxidant in such combinations. In many cases, it is also desirable to incorporate an antioxidant of this type in polyvinyl chloride resins and other halogen-containing resins. However, the polyhydric phenols are solids and the organic phosphites are liquids, and combinations thereof when sold for use by the converter of the resins are consequently nonhomogeneous slurries. The phenol tends to settle out in the container, and the fact that the composition is in the form of a slurry makes it difficult to incorporate the proper proportions of phenol and phosphite in the resin.

In accordance with the invention, organic phosphites are provided containing both a phosphite radical, important for the type of stabilization imparted by a phosphite, and a phenolic hydroxyl group, important for anti-oxidant effectiveness. These compounds are liquids, and easily incorporated in stabilizer compositions for addition to the resin, as well as being completely compatible with polyolefins and polyvinyl chloride resins in the proportions required for stabilization.

The monomeric phosphites of the invention can be characterized by the following formula:

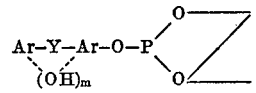

Ar is an aromatic nucleus. Z is one or a plurality of radicals taken singly or together in sufficient number to satisfy the valences of the two phosphite oxygen atoms. m has a value of from one to about five. Z can be hydrogen or an organic radical or radicals, which can be or include phenolic groups of the type

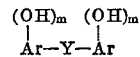

Y is a linking nucleus as hereinafter defined.

The Ar radical can be any aromatic nucleus, monocarbocyclic or polycarbocyclic, with condensed or separate rings, and the rings connected by the bivalent linking nucleus Y. Thus, Ar can be phenyl, naphthyl, phenanthryl, triphenylenyl, anthracenyl, pyrenyl, chrysenyl, fluorenyl, diphenyl, and triphenyl. The linking nucleus can be an alkylene group having from one to five carbon atoms, an oxygen atom alone, a sulfur or oxygen atom with an alkenylene radical, or a cycloalkylene radical, such as

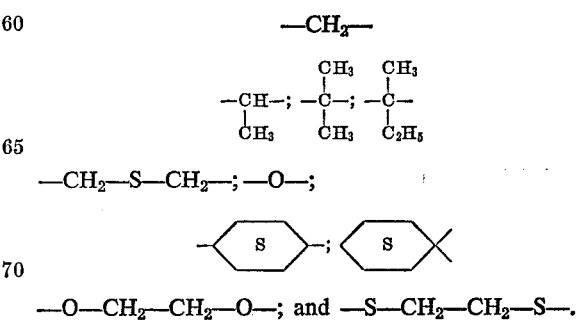

The Ar group has at least one phenolic hydroxyl group, and from one to about thirty carbon atoms per phenolic hydroxyl group. The Ar group contains one or more phenolic hydroxyl groups, and may contain one or more phenolic nuclei.

The aromatic nuclei can, if desired, be substituted by one or a plurality of halogen atoms, such as chlorine and bromine, and/or one or a plurality of alkyl, aryl or cycloalkyl substituents having one or more carbon atoms, up to the total number of thirty carbon atoms per phenolic hydroxyl group. Usually, the phenols will not have more than about eighteen carbon atoms in any alkyl, aryl, cycloalkyl, alicyclidene or alkylene group. The phenolic group can have from one to four substituent radicals per phenolic nucleus.

The Z radicals in the above formula, in a monomeric phosphite, in general, have from about one to about twenty-four carbon atoms. Z can, for example, be two univalent radicals, such as one or two hydrogen atoms, one or two aliphatic hydrocarbon radicals, such as methyl, ethyl, propyl, isopropyl, butyl, isobutyl, secondary butyl, tertiary butyl, amyl, isoamyl, hexyl, isohexyl, secondary hexyl, heptyl, octyl, isoctyl, 2-ethylhexyl, nonyl, decyl, undecyl, dodecyl, tetradecyl, tridecyl, octadecyl, and behenyl, one or two monovalent aryl radicals, such as phenyl, benzyl, phenethyl, xylyl, tolyl, and naphthyl, one or two univalent cycloaliphatic radicals, such as cyclohexyl, cyclopentyl, and cycloheptyl, and one or two heterocyclic radicals, such as pyridyl, tetrahydrofurfuryl, furyl and piperidinyl.

Z can also be a single radical forming a heterocyclic ring with the

group, such as a bivalent aliphatic hydrocarbon radical, for example, ethylene, 1,2-propylene, 1,3-propylene, 1,2-butylene, 1,3-butylene, 1,4-butylene, neopentylene, and 1,3-pentylene or such a radical as pentaerythrytene; a bivalent arylene or mixed alkylene arylene radical, such as 2-phenethylene, 1,4-phenylene, diphenylene, m-xylylene, o-xylylene and p-xylylene, a bivalent cycloalkylene radical, such as cyclohexylene and cyclopentylene; and a bivalent heterocyclic radical such as is derived from a disubstituted pyridine.

Z can of course include phenolic groups of the type (HO)$_m$—Ar; such groups will constitute the end groups in most polymeric phosphites.

The following compounds are illustrative of monomeric phosphite compounds coming within the invention;

1.  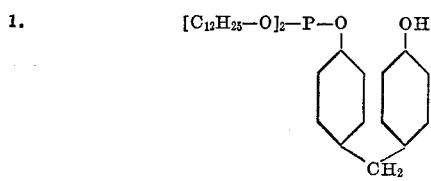

2.  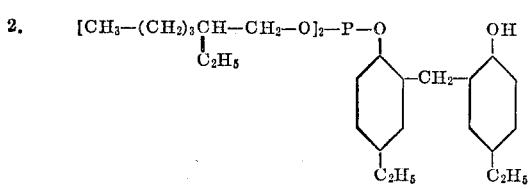

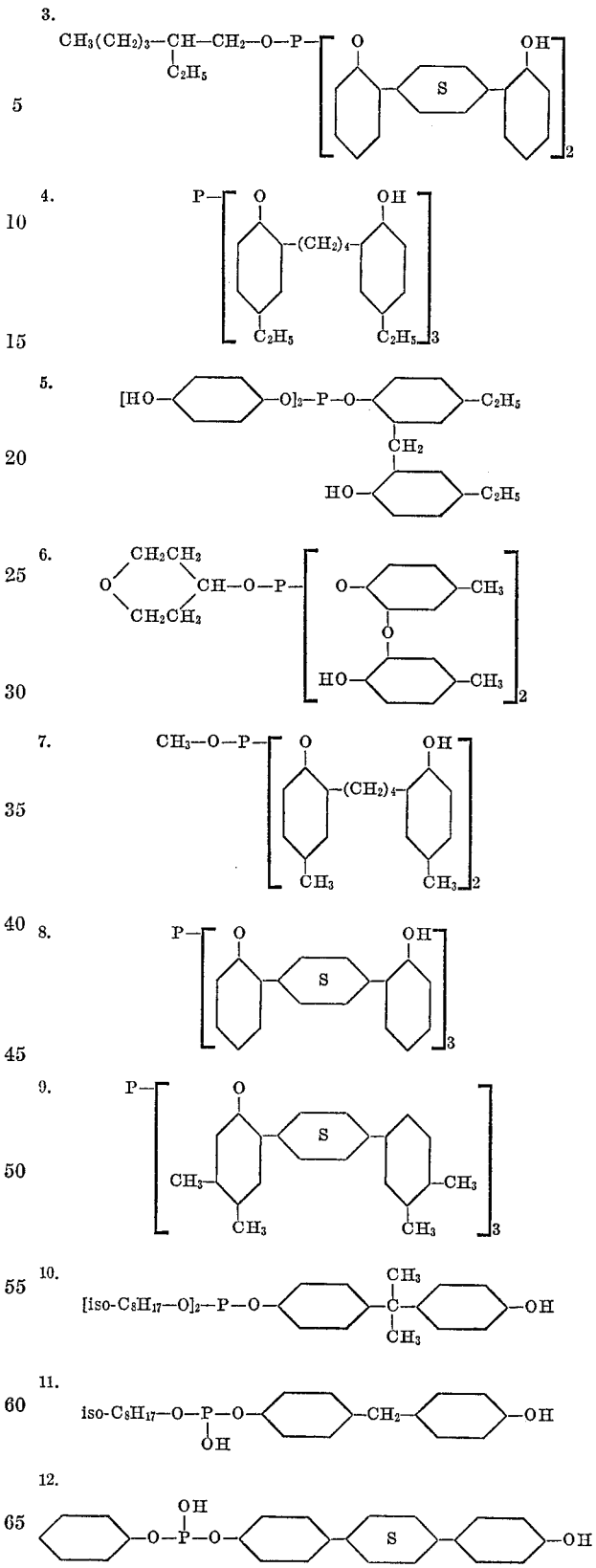

The compounds of the invention are readily obtained by transesterification of an aryl or alkyl phosphite with a polyhydric phenol. In the course of the reaction, the alkyl or aryl radicals of the phosphite are replaced by phenolic radicals.

The extent of substitution of groups by hydroxy/aromatic groups depends upon the proportions of the ingredients. Hydroxy aryl phosphites are formed even if less than one molar equivalent of polyhydric phenol is used. If one mole of the phenol is employed per mole of the phosphite, one phenolic group is introduced per phosphite group. If two moles of the phenol are employed, a bisphenolic phosphite is obtained, and if three moles are employed, all of the alkyl or aryl radicals of the phosphite can be replaced by phenolic radicals.

Inasmuch as polyhydric phenols are employed, each phenolic hydroxyl group can also react with phosphite so that polymeric and cyclic phosphites are obtainable, in which two or more of the phenolic groups replace alkyl or aryl radicals of the phosphite. The polymeric phosphites have at most two phenolic nuclei and at least one alkyl group per phosphite group. The polyaryl phenolic phosphites have demonstrated at best poor stabilizing action.

Typical of polymeric and cyclic phosphites are the following:

compounds of the type of compounds Nos. 1 to 16 above.

In order to minimize polymer formation, i.e., reaction of all of the phenolic hydroxyls, an excess of the phenol is usually employed, usually within the range from about 0.1 to about 3.0 moles in excess of that stoichiometrically required to form the desired phenolic phosphite.

The reaction will proceed in the absence of a catalyst, but a faster and more complete reaction is obtained if a catalyst is used. The catalyst employed ordinarily is an alkali or alkaline earth metal, which can be added in the form of the metal or in the form of an alkaline salt, such as an alkaline oxide, or as the alcoholate. Sodium is quite satisfactory, and so are sodium hydroxide, potassium hydroxide, the oxides and hydroxides of calcium, strontium and barium, and the alcoholates, usually of methyl, ethyl or isopropyl alcohol or phenolates of all of these metals. Only a very small amount of the catalyst

13.

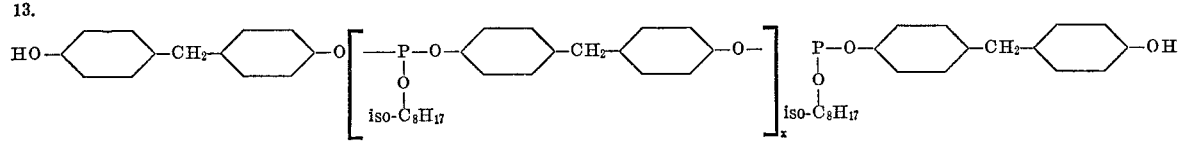

14.

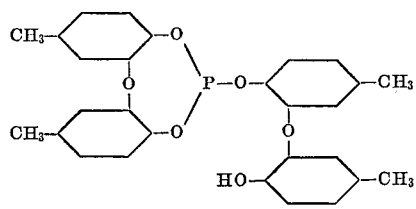

15.

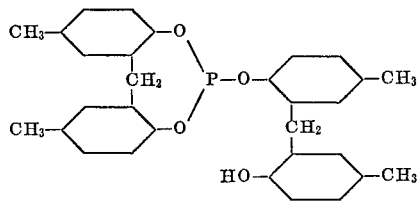

need be employed, for example, as little as from 0.01 to 2.0 percent by weight of the phosphite.

It is usually desirable that both the phenol and the phosphite be anhydrous, although very small amounts of water can be tolerated in the system. If sodium or potassium or the oxides of calcium, barium and strontium are added, they will react with the water or alcohol present to form the corresponding hydroxide or alcoholate, and the latter compound will then serve as a catalyst. A volatile alcohol, such as ethanol, methanol or isopropyl alcohol, can be added as a solvent, if the reactants are incompatible.

The phenol, phosphite, anhydrous alcohol if desired, and catalyst are mixed, and the reaction mixture then heated at an elevated temperature, usually under reflux. A temperature within the range from about 40 to about 150° C. can be employed. The alcohol or phenol corresponding to the alkyl or aryl group of the phosphite being substituted by phenol is liberated in the course of the reaction, and in order to drive the reaction to completion, it is usually desirable to continuously distill off the liberated alcohol or phenol. The reaction can be carried out for several hours time, and the alcohol or phenol then distilled out, in order to drive the reaction to completion. Vacuum distillation can be used if the phenol or alcohol has a high boiling point.

Exemplary phenols used in preparing phosphites of the invention are
methylenebis-(2,6-ditertiary butyl phenol),
2,2-bis(4-hydroxy phenyl) propane,

16.

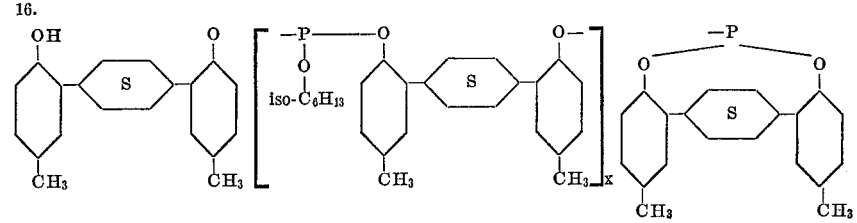

$x$ is the number of units within the brackets in the polymer, and ranges from 1 to about 10. All of such polymeric phosphites also are within the invention, and will usually be present in small amounts even in monomeric methylenebis-(p-cresol),
4,4'-oxobis(3-methyl-6-isopropyl phenol),
2,2'-oxobis(4-dodecyl phenol),
4,4'-n-butylidenebis-(2-t-butyl-5-methyl-phenol), 2,2'-methylenebis-(4-methyl-5-1'-methyl-cyclohexyl-phenol),
4,4'-cyclohexylidenebis-(2-tertiary-butyl-phenol),
2,6-bis(2'-hydroxy-3'-t-butyl-5'-methyl-benzyl)-4-methyl-phenol.

The following examples are illustrative of the preparatory procedure:

EXAMPLE I 100 g. of 4,4'-n-butylidene-bis(2-tertiary-butyl-5-methyl phenol), 30 g. of triisooctyl phosphite and 0.48 g. of sodium hydroxide were heated at 120 to 125° C. for three hours, forming a clear brown homogeneous liquid. This was then heated at 140° C. under reduced pressure, and the isooctanol which was distilled off was recovered. The weight of isooctanol recovered showed that the reaction product was tri-(4,4'-n-butylidene-bis(2-tertiary-butyl-5-methyl-phenol)) phosphite.

EXAMPLE II 100 g. of 4,4'-benzylidene-bis(2-tertiary-butyl-5-methyl-phenol), 60 g. of triphenyl phosphite and 0.48 g. of sodium hydroxide were heated at 120 to 125° C. for three hours, forming a clear brown solution. This was then heated at 140° C. under reduced pressure and the phenol which was distilled off was recovered. The weight of phenol recovered showed that the reaction product was (4,4' - benzylidene-bis(2-tertiary-butyl-5-methyl-phenol)) diphenyl phosphite.

EXAMPLE III

One mole of triphenyl phosphite (310 grams), 0.65 mole of 2,2'-bis(-parahydroxyphenyl) propane (148 grams) and 1.8 mole isooctanol (234 grams) were heated at 110 to 120° C. for three hours, together with 0.5 gram of sodium hydroxide. The reaction mixture was then vacuum stripped to 170° C. at the water pump to remove as much phenol as possible. 273 grams of phenol, 96% of the calculated quantity, was obtained, showing that the reaction product was isooctyl 2,2'-bis(-parahydroxyphenyl) propane phosphite.

EXAMPLE IV

One mole of triphenyl phosphite, 0.5 mole of 4,4'-n-butylidenebis(2-tertiary-butyl-5-methylphenol), and 2 moles of tridecyl alcohol were reacted in two stages. The triphenyl phosphite was first transesterified with the dihydric-phenol in the presence of 0.5 gram of sodium hydroxide, reacting the ingredients at 110 to 120° C. for three hours, and vacuum-stripping the mixture to 170° C. on the water pump. Next, the tridecyl alcohol was added, and the mixture again heated to 110 to 120° C. for three hours, and then vacuum stripped to 170° C. at the water pump. The combined strippings gave 89% of the calculated quantity of phenol at the first stage, and 98% at the second stage. The reaction product was tridecyl 4,4'-n-butylidene-bis(-2-tertiary butyl-5-methyl-phenol) phosphite.

EXAMPLE V 1.1 mole of isooctyl diphenylphosphite and 0.4 mole of 4,4'-thiobis(-2-tertiary butyl-5-methyl-phenol) were heated together in the presence of 0.5 gram of sodium hydroxide at 110 to 120° C. for three hours. The reaction mixture was then vacuum stripped to 170° C. at the water pump, obtaining 53½% of the calculated quantity of phenol. The reaction product was isooctyl phenyl 4,4'-thiobis (2-tertiary butyl-5-methylphenol) phosphite.

EXAMPLE VI 1.1 moles of triphenyl phosphite, 1.55 moles of 2-ethylhexanol and 0.33 mole of 2,2'-methylene-bis(-4-methyl-6-1'-methylcyclohexyl) phenol were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2' - methylenebis(-4 - methyl-6 - 1' - methylcyclohexyl) phenol was added, and the reaction mixture again heated at 110 to 120° C. for three hours, and vacuum stripped to 170° C. at the water pump. 83% of the calculated phenol was recovered. The reaction product was 2-ethylhexyl-2,2'-methylene-bis(4-methyl-6-1'-methylcyclohexyl) phenol phosphite.

EXAMPLE VII 3 moles of Bisphenol A (2,2'-bis-(parahydroxy phenyl) propane) and 1 mole of triphenyl phosphite were heated at 110 to 120° C. for three hours, together with 0.5 gram of sodium hydroxide. The reaction mixture was vacuum stripped to 170° C. at the water pump to remove as much phenol as possible. 98% of the calculated quantity of phenol was recovered, showing that the reaction product was tri(-2,2' - bis-(parahydroxy phenyl)propane) phosphite.

EXAMPLE VIII 2-ethylhexyl octylphenyl phosphite was trans-esterified with 4,4'-thio-bis(2-tertiary-butyl-5-methylphenol), heating them together in the presence of 0.5 gram of sodium hydroxide at 110 to 120° C. for three hours. The reaction mixture was vacuum stripped to 170° C. at the water pump, recovering both the 2-ethylhexanol and octylphenol in approximately the calculated quantity. The reaction product was tri-(4,4' - thio - bis(2-tertiary-butyl-5-methylphenol)) phosphite.

These organic phosphites, as has been indicated, are particularly effective stabilizers for polyvinyl chloride resins. The term "polyvinyl chloride" as used herein is inclusive not only of polyvinyl chloride homopolymers of all types, but also of copolymers of vinyl chloride in a major proportion, and other copolymerizable monomers in minor proportion, such as copolymers of vinyl chloride and vinyl acetate, copolymers of vinyl chloride and vinylidene chloride, copolymers of vinyl chloride with maleic or fumaric acid esters and copolymers of vinyl chloride with styrene, and copolymers of vinyl chloride with acrylonitrile, as well as mixtures of polyvinyl chloride resins in a major proportion with a minor proportion of other synthetic resins, such as chlorinated polyethylene, or copolymers of acrylonitrile butadiene and styrene. Among the polyvinyl chlorides which can be stabilized are the uniaxially-stretch-oriented polyvinyl chloride described in U.S. Pat. No. 2,984,593 to Isaksem et al., that is, syndiotactic polyvinyl chloride, as well as atactic and isotactic polyvinyl chlorides.

The organic phosphite compounds in the invention can, if desired, be employed in conjunction with other stabilizers for polyvinyl chloride resins, although, in most cases, the stabilization imparted by the organic phosphite compound will be sufficient. In some cases, however, for particular end uses, special stabilization effects may be desired.

As supplemental stabilizers, there can be employed metal salt stabilizers of the type described in the Leistner et al. Pat. Nos. 2,564,646 and 2,716,092 and other patents in this field. The metal salt stabilizer is a salt of a polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulphur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid $C_{12}H_{25}$—S—$(CH_2)_2$—COOH, hexahydrobenzoic acid, benzoic acid, phenylacetic acid, isobutyl benzoic acid, monethyl ester of phthalic acid, ethyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium, and the zinc, cadmium, lead and tin salts. Where these salts are not known they are made by the usual types of reaction, such as by mixing the acid, acid chloride or anhydride with the corresponding oxide or hydroxide of the metal in a liquid solvent, and heating, if necessary, until salt formation is complete. The barium, cadmium and zinc compounds are preferred.

The organic phosphites of the invention can also be employed together with the more familiarly known organic triphosphites which contain only aryl, alkyl, arylalkyl, alkaryl, cycloaliphatic, and heterocyclic groups having from one to twenty carbon atoms and from one to three heterocyclic atoms other than nitrogen. These phosphites are neutral, that is, all of the valences of the phosphorous atom are taken up with the said groups, which can be monovalent, bivalent or trivalent, as desired. Furthermore, these groups may be present in any combination. When bivalent or trivalent, they form heterocyclic rings of the type

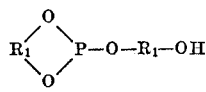

and may also form polymeric phosphites of the type

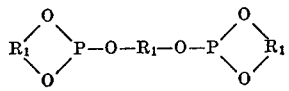

$R_1$ represents a bivalent group derived from a glycol. Exemplary are triphenyl phosphite, tricresyl phosphite, tri(dimethylphenyl) phosphite, tri-n-butyl phosphite, tri-isooctyl phosphite, tridodecyl phosphite, diisooctyl phenyl phosphite, neopentyl glycol phenyl phosphite, propylene glycol isooctyl phosphite, isooctyl diphenyl phosphite, tri(p-t-octylphenyl) phosphite, tri(p-t-nonylphenyl) phosphite, tri(p-t-nonyl-o-cresyl) phosphite, diethyleneglycol bis-butylene glycol bis-phosphite, tribenzyl phosphite, isobutyl dicresyl phosphite, isooctyl di(p-t-octylphenyl) phosphite, tri(2-ethylhexyl) phosphite, tri(2-cyclohexylphenyl) phosphite, tri-alpha-naphthyl phosphite, trifuryl phosphite, tritetrahydrofurfuryl phosphite, tricyclohexyl phosphite, and tricyclopentyl phosphite.

Also effective stabilizers are organic compounds containing at least one epoxy group. These compounds may be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic, and alicyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxy-propoxy) benzene, 4,4'-bis(2,3-epoxypropoxy) diphenyl ether, 1,8-bis(2,3-epoxypropoxy) octane, 1,4-bis (2,3-epoxypropoxy) cyclohexane, and 1,3-bis(4,5-epoxy pentoxy) 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2' - bis(4 - hydroxyphenyl) propane (Bisphenol A), 2,2-bis(4-hydroxyphenyl) butane, 4,4'-dihydroxy-benzophenone and 1,5-dihydroxy naphthalene with halogen-containing epoxides such as 3-chloro-1,2-epoxybutane, 3-chloro-1,2-epoxyoctane, and epichlorhydrin. Typical epoxy compounds that combine stabilizing with plasticizing action are listed below under plasticizers.

A total of from 0.5 to 10 parts by weight of the stabilizers can be used for each 100 parts by weight of the resin. More stabilizer composition can be used, but usually no better result is obtained, and therefore such amounts are uneconomical and wasteful.

Polyvinyl chloride resin compositions can also contain a plasticizer for the resin, such as dioctyl phthalate, dioctyl sebacate and tricresyl phosphate. Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

A small amount, usually not more than 1.5%, of a parting agent, also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene and paraffin wax.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet, five minutes, usually. After the mass is uniform, it is sheeted off in the usual way.

The following examples in the opinion of the inventors represent preferred embodiments of polyvinyl chloride resin compositions of their invention:

EXAMPLE 1

A series of polyvinyl chloride homopolymer formulations was prepared, having the following composition:

| Plastic composition: | Parts by weight |
|---|---|
| Dow PVC 111-4 (homopolymer of polyvinyl chloride) | 100 |
| Dioctyl phthalate | 45 |
| Isooctyl epoxy stearate | 5 |
| Phosphite as noted in Table 1 | 3 |

The dioctyl phthalate, isooctyl epoxy stearate and phosphite were mixed together and then blended with the polyvinyl chloride. The mixture was heated on a 2-roll mill up to 350° F., and sheeted off, and samples then were heated in an oven at 350° F. for 3½ hours to test heat stability. The discoloration was noted at 15 to 30 minute intervals, as reported in Table I below.

TABLE I

| Time of heating (minutes) | A Triphenyl phosphite | B Isooctyl diphenyl phosphite | C Phosphite of Example III [1] | D Phosphite of Example IV [2] | E Phosphite of Example V [3] | F Phosphite of Example VI [4] |
|---|---|---|---|---|---|---|
| Initial | Colorless | Colorless | Colorless | Colorless | Colorless | Colorless. |
| 15 | Yellow | Yellow | Yellow | Yellow | Yellow | Yellow. |
| 60 | Orange brown | Deep orange | Amber | Orange | Amber | Orange. |
| 90 | Red-brown | Orange-brown | Orange | Deep orange | Deep orange | Deep orange. |
| 120 | do | Red-brown | do | do | do | Do. |
| 135 | Dark brown | Dark brown | do | do | do | Do. |
| 150 | | | do | do | do | Do. |
| 180 | | | do | do | Orange-brown | Do. |
| 210 | | | Red brown | Red brown | Red brown | Red brown. |

[1] 2,2'-bis(parahydroxyphenyl) propane isooctyl phosphite.
[2] 4,4'n-butylidene bis(2-tertiary butyl-5-methyl phenol) tridecyl phosphite.
[3] Isooctyl 4,4'thiobis (2-tertiary butyl-5-methyl phenol) phosphite.
[4] 2-ethylhexyl 2,2'-methylene-bis(4-methyl-6-'1methyl-cyclohexyl phenol) phosphite.

It is apparent from the above results that the phosphites of the invention containing free phenol groups in addition to the phosphite nucleus provided superior long term stability and better color after 3½ hours of heating at 350° F. The fact that they were able to provide better long-term heat stability for as much as 3½ hours is quite remarkable.

EXAMPLE 2

A series of formulations was prepared having the following composition:

| Plastic composition: | Parts by weight |
|---|---|
| Pliovic DB80-V (homopolymer of polyvinyl chloride) | 100 |
| Tri-2-ethylhexyl phosphate | 40 |
| Epoxy soybean oil | 5 |
| Zinc stearate | 0.1 |
| Phosphite as noted in Table II | 3 |

The tri-2-ethylhexyl phosphate, epoxy soybean oil, zinc stearate and phosphite were mixed together and then blended with the polyvinyl chloride. The mixture was heated on a 2-roll mill up to 350° F., sheeted off, and samples heated in an oven at 350° F. for two hours to test heat stability. The discoloration was noted at 15 minute intervals, and is reported in Table II following.

TABLE II

| Time of heating (minutes) | G Triphenyl phosphite | H Phosphite of Example III [1] | I Phosphite of Example IV [2] |
|---|---|---|---|
| Initial | Colorless | Colorless | Colorless. |
| 15 | Dark red | Yellow | Yellow. |
| 30 | Dark red-brown | Amber | Amber. |
| 45 | | do | Do. |
| 60 | | do | Do. |
| 75 | | do | Do. |
| 90 | | Orange | Deep orange. |
| 105 | | do | Do. |
| 120 | | Orange-brown | Red-brown. |

[1] Isooctyl 2,2'-bis-(parahydroxy phenol) propane phosphite.
[2] Tridecyl 4-4'n-butylidene-bis-(2-tertiary butyl-5-methyl phenol) phosphite.

It is apparent from the above results that the phosphites of the invention containing free phenol groups in addition to the phosphite nucleus provided superior long term stability and better color after two hours of heating at 350° F. These results are particularly outstanding because polyvinyl chloride resin compositions containing tri-2-ethylhexyl phosphate and like phosphate plasticizers are particularly difficult to stabilize.

EXAMPLE 3

A series of formulations was prepared having the following composition:

| Plastic composition: | Parts by weight |
|---|---|
| Geon 101 EP (homopolymer of polyvinyl chloride) | 100 |
| Dioctyl phthalate | 50 |
| Barium cadmium laurate | 2 |
| Phosphite as noted in Table III | 1 |

The dioctyl phthalate, barium cadmium laurate and phospite were mixed together and then blended with the polyvinyl chloride. The mixture was heated on a 2-roll mill up to 350° F., sheeted off, and samples then heated in an oven at 350° F. to test them for heat stability. The total heating time was four hours. The discoloration was noted at 15 minute intervals, and is reported in Table III following.

TABLE III

| Time of heating (minutes) | Triphenyl phosphite | Tri-2,2'-bis (-parahydroxy phenyl) propane phosphite | Phosphite of Example IV [1] | Phosphite of Example III [2] | Phosphite of Example V [3] | Octylphenol 4,4'-thiobis (2-tertiarybutyl-5-methyl phenol) phosphite | Phosphite of Example VI [4] |
|---|---|---|---|---|---|---|---|
| | J | K | L | M | N | O | P |
| Initial | Colorless | Colorless | Colorless | Colorless | Colorless | Colorless | Colorless |
| 30 | Very pale yellow | Very pale yellow | Very pale yellow | Very pale yellow | Very pale yellow | Very pale yellow | Very pale yellow |
| 45 | do | do | do | do | do | do | Do |
| 60 | do | do | do | do | do | do | Do |
| 75 | do | Pale yellow | do | do | do | Yellow | Do |
| 90 | Pale yellow | do | Pale yellow | Pale yellow | Pale yellow | do | Pale yellow |
| 105 | do | Yellow | do | do | do | do | Do |
| 120 | do | do | do | do | do | do | Do |
| 135 | Yellow | do | do | Yellow | Yellow | Amber | Yellow |
| 165 | Yellow with brown edges | do | Yellow | do | do | do | Do |
| 180 | do | Amber | do | do | do | do | Do |
| 195 | Dark yellow with black edges | do | do | do | do | Amber with brown edges | Yellow with slight brown edges |
| 225 | | Amber with slightly black edges | do | Yellow with brown edges | Yellow with slightly brown edges | Amber with black edges | Yellow with brown edges |
| 240 | | Amber with black edges | Yellow with brown edges | do | Yellow with brown edges | Black | Do |

[1] Tridecyl 4,4'-n-butylidene-bis-(2-tertiary-butyl-5-methyl phenol) phosphite.
[2] Isooctyl 2,2'-bis(parahydroxy phenyl) propane phosphite.
[3] Isooctyl 4,4'-thio-bis-(2-tertiary-butyl-5-methyl phenol) phosphite.
[4] 2-ethylhexyl 2,2'-methylene-bis(4-methyl 6-1'methylcyclohexyl)phenol phosphite.

It is apparent from the above results that the phosphites of the invention containing free phenol groups in addition to the phosphite nucleus provided superior long term stability and better color after two to four hours of heating at 350° F. The fact that they are able to provide better long-term heat stability for as much as four hours is quite remarkable.

EXAMPLE 4

A series of formulations was prepared having the following composition:

Plastic composition: Parts by weight
- Dow PVC 111-4 (homopolymer of polyvinyl chloride) — 100
- 2-ethylhexyl diphenyl phosphate — 25
- Isooctyl epoxy stearate — 10
- Barium cadmium laurate — 2
- Phosphite as noted in Table IV — 1

The 2-ethylhexyl diphenyl phosphate, barium cadmium laurate, epoxy isooctyl stearate and phosphite were mixed together and then blended with the polyvinyl chloride. The mixture was heated on a 2-roll mill up to 350° F., sheeted off, and samples then heated in an oven for four hours at 350° F. to determine heat stability. The discoloration was noted, and is reported in Table IV below.

It is apparent from the above results that the phosphites of the invention containing free phenol groups in addition to the phosphite nucleus provided superior long term stability and better color after two to four hours of heating at 350° F. The fact that they are able to provide better long-term heat stability for as much as four hours is quite remarkable.

EXAMPLE 5

Example 1 was repeated, employing as the resin Vinylite VYHM, a copolymer of 87% vinyl chloride and 13% vinyl acetate, and 50 parts of dioctyl phthalate. Similar results were obtained.

The organic phosphites of the invention also are effective stabilizers for olefin polymers such as polyethylene, polypropylene, polybutylene, and higher polyolefins.

Olefin polymers on heating and working in air undergo degradation, resulting in a loss in melt viscosity. This problem is particularly serious with polypropylene. The organic phosphites of the invention are effective in overcoming this reduction in melt viscosity and in this respect represent an extension upon U.S. application Ser. No. 712,306, filed Jan. 31, 1958, now U.S. Pat. No. 3,015,644, patented Jan. 2, 1962.

The organic phosphites can be employed with any olefin polymer, including low-density polyethylene, high-density polyethylene, polyethylenes prepared by the Zieg-

TABLE IV

| Time of heating (minutes) | Tri-2,2'-bis (parahydroxy phenyl) propane phosphite | Phosphite of Example IV [1] | Phosphite of Example V [2] | Phosphite of Example VI [3] |
|---|---|---|---|---|
| Initial | Colorless | Colorless | Colorless | Colorless |
| 15 | Pale yellow | Very pale yellow | Very pale yellow | Very pale yellow |
| 30 | do | do | do | Do |
| 45 | Yellow | do | do | Do |
| 60 | do | Pale yellow | do | Do |
| 75 | do | do | do | Do |
| 90 | Amber | Yellow | Yellow | Do |
| 105 | do | do | do | Yellow |
| 120 | do | do | do | Do |
| 135 | do | Amber | do | Do |
| 150 | Orange | do | do | Amber |
| 165 | do | Orange | do | Do |
| 180 | Deep orange | do | do | Do |
| 195 | do | do | Amber | Do |
| 210 | Orange-brown | do | do | Orange |
| 225 | do | do | Orange | Do |
| 240 | do | do | do | Do |

[1] Tridecyl 4,4'-n-butylidene-bis-(2-tertiary butyl-5-methyl phenol) phosphite.
[2] Isooctyl 4,4'-thiobis (2-tertiary-butyl-5-methyl phenol) phosphite.
[3] 2-ethylhexyl 2,2'-methylene-bis-(4-methyl-6,1-cyclohexyl) phenol phosphite.

ler process, polypropylenes prepared by the Ziegler process, and by other polymerization methods from propylene, poly(butene-1), poly(pentene-1), poly(3-methylbutene-1), poly(4-methyl-pentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the phosphites of the invention. The term "olefin polymer" encompasses both homopolymers and copolymers.

The phosphite is incorporated with the olefin polymer alone or in conjunction with other olefin polymer stabilizers. A number of such stabilizers are disclosed in U.S. Patent No. 3,149,093, patented Sept. 15, 1964, and any of these can be employed as described herein. The phosphite can be added to an olefin polymer such as polypropylene or polyethylene which has not been degraded to a significant degree, and if it is added at this stage, it is capable of holding the rate of reduction in melt viscosity to a very low level. If the stabilizer or stabilizer combination is added to the olefin polymer at a stage of degradation, it is capable of holding the rate of reduction in melt viscosity thereafter to a very low level.

A sufficient amount of the stabilizer is used to hold the change in melt viscosity with time at the hot-working temperature to the limit required for working with the equipment at hand. Very small amounts are usually adequate. Amounts within the range from about 0.005 to about 5% by weight of the olefin polymer are satisfactory. Preferably, from 0.1 to 1% is employed for optimum stabilization. There is no real upper limit on the amount of stabilizer but inasmuch as these compounds are expensive, it is usually desirable to use the minimum necessary to give the required stabilization.

After the polypropylene has been worked so that its melt viscosity has been reduced to the desired range, the stabilizer is incorporated in the polymer in suitable mixing equipment, such as a mill or a Banbury mixer. Working and blending is continued until the mixture is substantially uniform. The resulting composition is then removed from the mixing equipment, and reduced to the size and shape desired for marketing or use.

The following examples represent embodiments of polypropylene stabilized with phosphites in accordance with the invention.

EXAMPLE 6

A stabilized polypropylene composition was prepared using as the phosphite stabilizer the phosphite of Example IV, together with a metal salt, zinc 2-ethyl hexoate. The phosphite, phenol and metal salt were blended together to yield a stabilizer of the following composition:

Stabilizer composition: Parts by weight
   4,4' - n - butylidene-bis-(2-tertiary-butyl-5-methylphenol) phosphite _____ 375
   Zinc 2-ethylhexoate _____ 125

The stabilizer blend was dispersed by hand-stirring in powdered, previously unstabilized polypropylene (Pro-Fax 6501, reduced specific viscosity (RSV) 3.0, melt index 0.4, ASTM D1238-57T at 190° C.) in an amount of 0.5% stabilizer by weight of the resin. The mixture was placed on a 2-roll mill and fluxed for five minutes at 170±2° C. Pieces cut from the milled sheet were used in the standard tests described below. The standard sample used in testing was 200 g., except for the Brabender Plastograph, which was 35 g. The stabilizers were incorporated as described in the working example and milled to a sheet. Pieces cut from the milled sheet were then used in the test procedures.

Brabender plastograph (reduction in melt viscosity)

This instrument is essentially a heated sigma-blade mixer in which the torque applied to the blades at 60 r.p.m. is continuously measured and plotted on a chart as kg.-cm. of torque. The bowl is maintained at 193° C. The charge is 35 g. polypropylene. Temperature of the plastic is 205–215° C., owing to frictional heat build-up.

Oven test, 205° C. (heat stability)

Small squares cut from a milled sheet are exposed in a forced-draft air oven lying flat on aluminum foil. Samples are removed at 15 minute intervals and examined for loss of shape, flow-out, or melting, which constitute failure. Color is noted at failure.

Compression molding, 190° C. (Resistance to embrittlement and loss of plasticity)

Pieces cut from a milled sheet are compression-molded at 190° C. for five minutes to give 6 x 6 inch slabs 20 mils (about 0.5 mm.) or 75 mils thick. Plasticity and color are then noted.

Heat ageing, 150° C. oven (heat stability of molded samples)

Molded samples made as above are heated flat on aluminum foil in an air circulating oven at 150° C. Samples are removed daily and examined for cracking or powdering, either of which constitutes failure. Color is noted at the end of two days, if the sample has not yet failed.

Weatherometer (resistance to light deterioration)

The molded samples were held in a weatherometer at 51° C. black panel temperature, and noted every 16⅔ hours for development of cracking, either of which constitutes failure. Color is noted at the end of fifty hours.

Compression molding at high temperature, 287° C. (550° F.) (resistance to embrittlement and loss of plasticity at high temperatures)

Moldings are made as above, held in the mold thirty minutes at 287° C. (550° F.), cooled and examined for color and plasticity. Unstabilized as well as over-stabilized formulations crack and discolor under these conditions.

Brabender plastograph, 193° C., 60 r.p.m.

Stabilizer system: (Kg.-cm. of torque)
   After 5 minutes working _____ 1300
   After 15 minutes working _____ 1260
   After 25 minutes working _____ 1160
   Color, 25 minutes, light gray.

Oven test, 205° C.

Stabilizer system:
   Time to failure _____ 2 hours.
   Initial color _____ Colorless.
   Color at failure _____ Light gray.

Compression molding, 6 x 6 inch slabs, 20 and 75 mils thick

Stabilizer system:
   Condition _____ Good.
   Color _____ Colorless.

Heat ageing: molded 20 mil specimens, 150° C.

Stabilizer system:
   Days to failure _____ 6½.
   Color, 2 days _____ Light gray.

Weatherometer exposure, 20 mil specimens, 51° C. black panel temperature

Stabilizer system:
   Hours to failure _____ 120.
   Color, 50 hours _____ Colorless.

High-temperature compression molding, 287° C.

Stabilizer system:
   Condition _____ Good.
   Color _____ Colorless.

EXAMPLE 7

Two stabilized polypropylene compositions were prepared, using the phosphite stabilizer of Example VII together with metal salt, which were blended to yield a stabilizer of the following composition:

| Stabilizer composition: | Parts by weight |
|---|---|
| 4,4'-thio-bis(2-tertiarybutyl-5-methyl-phenol) phosphite | 375 |
| Zinc 2-ethylhexoate | 125 |

This composition was blended with polypropylene (Pro-Fax 6501) in the amount given in the table, and then tested by the standard heat-ageing test in comparison with a similar composition containing the blend, with the addition of dilauryl thiodipropionate.

TABLE V

| Stabilizer system | Stabilizer composition | Dilauryl thiodipropionate | Heat ageing, molded 20 mil specimens, 150° C. | |
|---|---|---|---|---|
| | | | Days to failure | Color 2 days |
| A | 0 | 0 | 1 | Colorless. |
| B | 0.25 | 0 | 3 | Do. |
| C | 0.50 | 0 | 6 | Do. |
| D | 1.00 | 0 | 8 | Do. |
| E | 0 | 0.3 | 3 | Do. |
| F | 0 | 1 | 3 | Do. |
| G | 0.10 | 0.3 | 4 | Do. |
| H | 0.25 | 0.3 | 3 | Do. |
| I | 0.45 | 0.1 | 15 | Do. |
| J | 0.45 | 0.2 | 26 | Do. |
| K | 0.45 | 0.3 | 34 | Do. |
| L | 0.35 | 0.5 | 40 | Do. |
| M | 0.55 | 0.3 | 37 | Do. |
| N | 0.75 | 0.3 | 34 | Do. |

The very considerable improvement in resistance to ageing at 150° C. due to the dilauryl thiodipropionate is evident from the data. Reduction in melt viscosity was small in 45 minutes, and heat stability, resistance to embrittlement and loss of plasticity at low and high temperatures, and resistance to light deterioration, are all rated as excellent.

EXAMPLE 8

Two stabilized polypropylene compositions were prepared, using a blend of phosphite, phenol and metal salt, 4,4'-n-butylidene-bis(2-tertiary-butyl - 5 - methylphenol), 2-ethylhexyl - 2,2' - methylene-bis(4-methyl-6,1'-methylcyclohexyl) phenol phosphite, and zinc 2-ethylhexoate, of the following composition:

| Stabilizer composition: | Parts by weight |
|---|---|
| 4,4' - n - butylidene - bis(2 - tertiary - butyl-5-methylphenol) | 100 |
| 2 - ethylhexyl - 2,2' - methylene - bis(4-methyl-6,1'-methylcyclohexyl) phenol phosphite | 275 |
| Zinc 2-ethylhexoate | 125 |

This composition was blended with polypropylene (Pro-Fax 6501) in an amount of 0.6%, and then tested by the standard heat-ageing test in comparison with a similar composition containing the blend in an amount of 0.6%, with the addition of 0.3% diluaryl thiodipropionate. The composition without the dilauryl thiodipropionate was stable for six days, and the composition with the thiodipropionate, for 24 days. Both compositions were colorless at the end of two days.

Reduction in viscosity was small in 45 minutes and heat stability, resistance to embrittlement and loss of plasticity at low and high temperature, and resistance to light deterioration, are all rated as excellent.

Having regard to the foregoing disclosure the following is claimed as the inventive and patentable embodiments thereof:

1. An organic phosphite having in the molecule at least one polycarbocyclic phenolic group $$Ar-Y-Ar$$
$$(OH)_m$$

for each phosphite group, said polycarbocyclic phenolic group having from one to about thirty carbon atoms per phenolic hydroxyl group, the triphosphite having the formula:

$$Ar-Y-Ar-O-P \begin{matrix} O- \\ \diagdown \\ O- \end{matrix} Z$$
$$(OH)_m$$

wherein Ar is a carbocyclic aromatic nucleus and at least one Ar nucleus has a phenolic hydroxyl group (OH); $m$ has a value of from one to about two; and $Z$ is taken in sufficient number to satisfy the valences of the two phosphite oxygen atoms and is selected from the group consisting of hydrogen, monovalent and bivalent organic aliphatic, aromatic and cycloaliphatic hydrocarbon radicals having from about one to about twenty-four carbon atoms; and monovalent and bivalent phenolic groups having from one to about thirty carbon atoms per phenolic hydroxyl group, and selected from the group consisting of $(HO)_m$—Ar and $$Ar-Y-Ar$$
$$(OH)_m$$

which in polymeric phosphites are linked to additional phosphite groups, such polymeric phosphites containing at least one alkyl group having from one to about twenty-four carbon atoms per phosphite group, and Y is a linking group selected from the group consisting of oxygen, alkylene, oxyalkylene, sulfoalkylene, and cyclohexylene, the alkylene having from one to about five carbon atoms.

2. An organic triphosphite in accordance with claim 1 in which Ar is a benzene ring.

3. An organic triphosphite in accordance with claim 1 in which Z is at least one alkyl group.

4. An organic triphosphite in accordance with claim 1 in which Z is at least one aryl group.

5. An organic triphosphite in accordance with claim 1 in which Z is at least one mixed alkyl aryl radical.

6. A polymeric organic phosphite according to claim 1 having the formula:

$$Ar-Y-Ar- \begin{bmatrix} O-P-O-Ar-Y-Ar- \\ | \\ O \\ | \\ R \end{bmatrix}_x -O-P-O-Ar-Y-Ar$$
$$(OH)_m \qquad\qquad\qquad\qquad\qquad\qquad (OH)_m$$

wherein $m$ has a value of from about 1 to about 2, $x$ has a value of from 1 to about 10 and R is alkyl having from one to about eighteen carbon atoms.

References Cited

UNITED STATES PATENTS

| 2,472,504 | 6/1949 | Winning | 260—949 X |
| 3,112,286 | 11/1963 | Morris et al. | 260—953 X |
| 3,297,631 | 1/1967 | Bown et al. | 260—953 UX |
| 3,361,846 | 1/1968 | Gleim et al. | 260—953 X |
| 3,378,524 | 4/1968 | Larrison | 260—930 X |

OTHER REFERENCES

Kirpichnikov et al., Index Chemicals, vol. 19 (1965), 58245.

CHARLES B. PARKER, Primary Examiner

A. H. SUTTO, Assistant Examiner

U.S. Cl. X.R.

260—936, 937, 953, 45.95, 294.7, 290, 347.8, 982, 927